United States Patent [19]

Shah et al.

[11] Patent Number: 4,707,268
[45] Date of Patent: Nov. 17, 1987

[54] HOLLOW FIBER POTTED MICROFILTER

[75] Inventors: Dilip H. Shah, Gurnee; Clinton Kopp, Barrington, both of Ill.

[73] Assignee: Baxter Travenol Laboratories, Inc., Deerfield, Ill.

[21] Appl. No.: 821,512

[22] Filed: Jan. 22, 1986

Related U.S. Application Data

[63] Continuation of Ser. No. 546,333, Oct. 28, 1983, abandoned, which is a continuation of Ser. No. 434,988, Oct. 18, 1982, abandoned.

[51] Int. Cl.4 .............................................. B01D 13/01
[52] U.S. Cl. ................................................. 210/650
[58] Field of Search ................................. 210/649–655, 210/247, 321, 323.2, 433, 438, 439, 456; 55/158; 422/48; 546/333

[56] References Cited

U.S. PATENT DOCUMENTS

| | | | |
|---|---|---|---|
| 2,730,241 | 1/1956 | Thomas | 210/165 |
| 3,422,008 | 1/1969 | McLain | 210/321.5 X |
| 3,442,002 | 5/1969 | Geary, Jr. et al. | 210/321.1 X |
| 3,498,909 | 3/1970 | Littman | 210/321.1 |
| 3,503,515 | 3/1970 | Tomsic | 210/321.1 |
| 3,666,109 | 5/1972 | Goeldner | 210/433.2 X |
| 3,696,932 | 10/1972 | Rosenberg | 210/437 |
| 3,702,658 | 11/1972 | McNamara et al. | 210/321.1 |
| 3,708,071 | 1/1973 | Crowley | 210/321 |
| 3,850,813 | 11/1974 | Pall et al. | 210/232 |
| 3,893,920 | 7/1975 | Hubbard et al. | 210/197 |
| 3,930,105 | 12/1975 | Christen et al. | 210/321 X |
| 3,953,334 | 4/1976 | Brun et al. | 210/321 |
| 3,984,319 | 10/1976 | Hubbard et al. | 210/136 |
| 4,025,436 | 5/1977 | Tsuda et al. | 210/321 |
| 4,031,012 | 6/1977 | Gics | 210/321 |
| 4,075,100 | 2/1978 | Furuta et al. | 210/266 |
| 4,080,296 | 3/1978 | Clark | 210/323.2 |
| 4,084,036 | 4/1978 | Leonard | 210/500 X |
| 4,126,559 | 11/1978 | Cooper | 210/445 |
| 4,154,688 | 5/1979 | Pall | 210/487 |
| 4,187,180 | 2/1980 | Joh | 210/321 |
| 4,201,673 | 5/1980 | Kanno et al. | 210/321 |
| 4,202,776 | 5/1980 | Joh | 210/321 |
| 4,212,744 | 7/1980 | Oota | 210/321 |
| 4,219,426 | 8/1980 | Spekle et al. | 210/232 |
| 4,220,535 | 9/1980 | Leonard | 210/456 X |
| 4,228,012 | 10/1980 | Pall | 210/238 |
| 4,244,820 | 1/1981 | Hauk et al. | 210/194 |
| 4,289,623 | 9/1981 | Lee | 210/247 |
| 4,306,972 | 12/1981 | Denti et al. | 210/321.3 |
| 4,498,990 | 2/1985 | Shaldon et al. | 210/433.2 |

Primary Examiner—David Sadowski
Attorney, Agent, or Firm—Paul C. Flattery; Daniel D. Ryan

[57] ABSTRACT

A filter (10) and a method of filtering fluids is provided. In the filter (10), a plurality of porous, hollow fibers (20) surround a central tube (18) and are contained by a housing (12). The ends of the assembly are potted with a sealant to define first and second sealant-impregnated ends (22, 24) having open flow paths through the hollow fibers (20) and central tube (18) from one end to the other. A manifold (16) defining a typically closed chamber covers one end of the assembly and another manifold (14) covers the other end and defines a fluid portal (26) to the tube (18) and hollow fibers (20). Fluid may be filtered by passing it through the pores of the hollow fibers (20) from the outside to the inside and draining fluid from the portal (26). Alternatively, filtering of a fluid may be accomplished by introducing fluid through the portal (26) and passing it through the pores of the hollow fibers (20) from inside to out.

1 Claim, 6 Drawing Figures

U.S. Patent   Nov. 17, 1987   Sheet 1 of 3   4,707,268
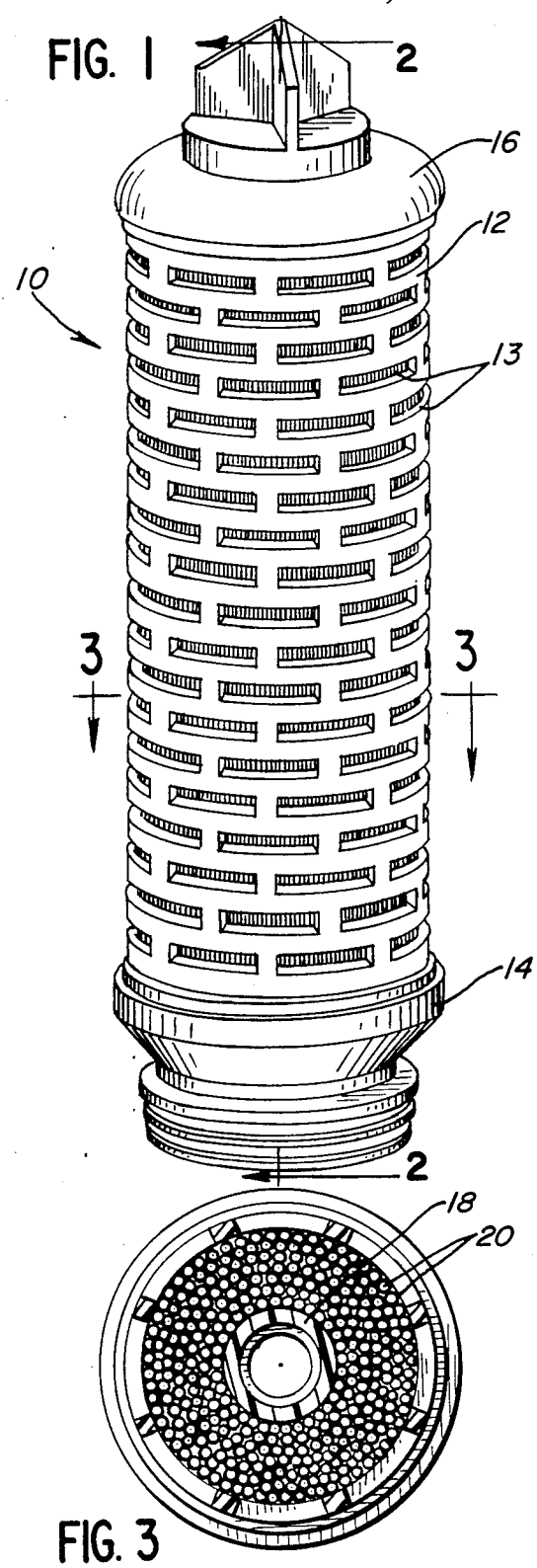
FIG. 1
FIG. 3
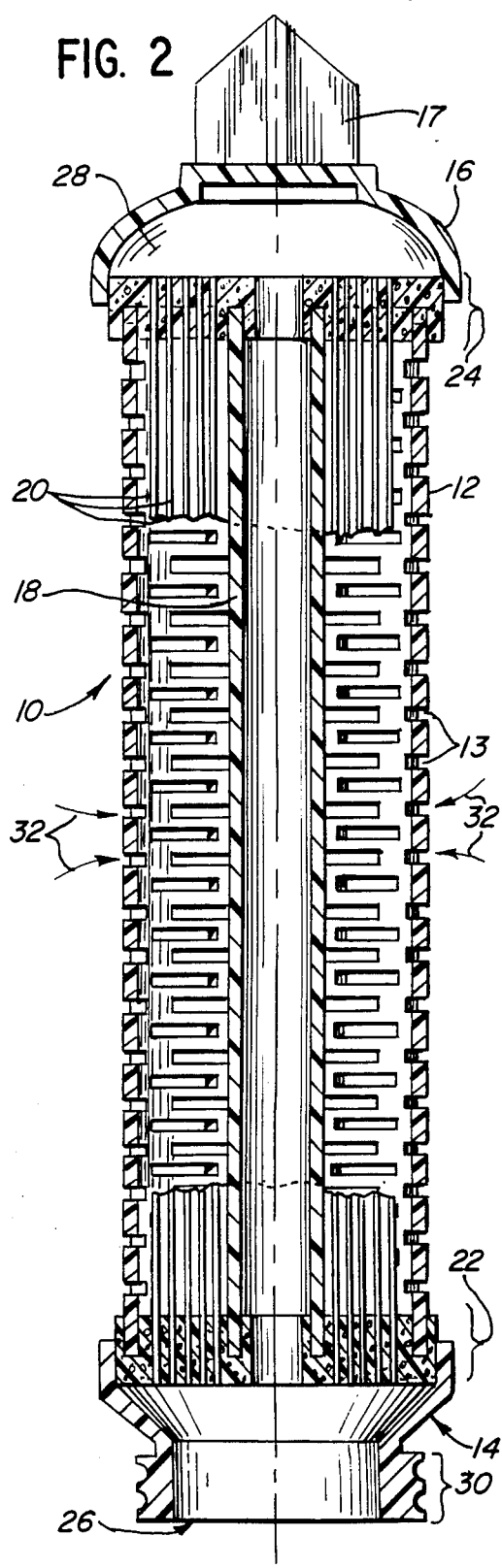
FIG. 2

HOLLOW FIBER POTTED MICROFILTER

This is a continuation of application Ser. No. 546,333, filed Oct. 28, 1983 (now abandoned), which was a continuation of application Ser. No. 434,988, filed Oct. 18, 1982 (also now abandoned).

FIELD OF THE INVENTION

This invention relates to filters and more specifically to filters for the filtration of medical fluids. Particularly, the invention relates to microfilters used in the filtration of parenteral solutions during their manufacture. Porous, hollow fibers arranged in a cylindrical bundle generally comprise a permeating region to permeate fluid flowing from the exteriors of the fibers through porous, membrane walls to the interiors of the hollow fibers. Fluid can also be filtered by permeating fluid flowing from the interiors of the fibers through porous, membrane walls to the exteriors of the hollow fibers. The permeation is based on the principles of microfiltration.

BACKGROUND OF THE INVENTION

Conventional, hollow fiber permeability apparatus are extensively used in the medical field, for example in hemodialysis. Examples of hollow fiber permeability apparatus used in hemodialysis are as follows: U.S. Pat. No. 4,306,972, *Dialysis Apparatus*, to Denti, et al.; U.S. Pat. No. 4,289,623, *Hollow Fiber Dialysis*, to Lee; U.S. Pat. No. 4,219,426, *Dialysis Device*, to Spekle, et al.; U.S. Pat. No. 4,212,744, *Haemodialyzer Apparatus*, to Oota; U.S. Pat. No. 4,202,776, *Hollow-Fiber Permeability Apparatus*, to Joh; U.S. Pat. No. 4,187,180, *Hollow-Fiber Permeability Apparatus*, to Joh; U.S. Pat. No. 4,201,673, *Apparatus for Dialysis of Solution*, to Kanno, et al.; U.S Pat. No. 4,031,012, *Separatory Apparatus*, to Gics; and U.S. Pat. No. 3,708,071, *Hollow Fiber Membrane Device and Method of Fabricating Same*, to Crowley. These hollow fiber apparatus have unidirectional blood flow through the hollow fibers from inlet to outlet. Microsolutes and water are passed through the hollow fiber membrane. Differences in the concentration of ions on each side of the membrane allow the desired ions to be drawn from the blood.

Hollow fiber membrane technology is also used in apparatus commonly known as artificial lungs. In artificial lungs, oxygen and carbon dioxide are exchanged with each other to increase blood oxygen content. Reverse osmosis apparatus also employ the technology of permeable hollow fibers. These apparatus are used in purification or desalination of water where the membrane retains virtually all ions and passes water. Examples of hollow fibers particularly adapted for use in reverse osmosis are found in the following references: U.S. Pat. No. 4,084,036, *Asymmetric Hollow Acrylic Fibers*, to Leonard; U.S. Pat. No. 3,953,334, *Fluid Fractionating Apparatus*, to Brun, et al.; and U.S. Pat. No. 3,930,105, *Hollow Fibres*, to Cristen, et al.

Porous, hollow fibers are used in a wide variety of permeability and flat applications because of a basic advantage over flat membranes. Available surface area is increased by choosing porous, hollow fibers thereby reducing space requirements for permeability apparatus.

Hollow fiber filters have been constructed with one end of a hollow fiber bundle closed. During filtration using a sealed end filter, fluid flows into the unsealed ends and is filtered across the membrane of the porous, hollow fibers. Alternatively, filtrate can flow across the membrane of the porous, hollow fibers and exit through the single open end area. Fluid filtered at the end farthest from the main flow stream has to flow through the entire length of fiber in either alternative. This reduces the efficiency of the filter. A large percentage of the pressure differential is used to move fluid within the hollow fibers rather than across the membrane of the hollow fibers for filtration. Consequently, pressure differentials are high and flow rates are low.

A filter can also be constructed by bending the open ends of the bundle of fibers back on themselves in a generally "U"-shaped configuration, and feeding into both ends. For example, see U.S. Pat. No. 4,075,100, *Dialysis Unit and Dialysis Apparatus Employing the Dialysis Unit*, to Furuta, et al. and U.S. Pat. No. 4,025,436, *Liquid Treatment Apparatus*, to Tsuda, et al. Other difficulties must be addressed where generally "U"-shaped configuration filters are used. When the hollow fibers are bent in a "U" shape, hollow fibers close to the smaller, inner radius of the "U" can be pinched shut. Hollow fibers close to the larger, outer radius are under tension and can be flattened shut. Compromising the arc of the "U" bend to avoid these problems also compromises the overall size of the filter. Furthermore, a shorter and stouter "U"-shaped device is more cumbersome to pot and its transverse dimension is inconveniently large.

It is desirable to provide a microfilter where the pressure differential across the filter membrane can be lowered and where the filtrate flow rate is increased, thereby increasing the overall efficiency of the microfilter. Furthermore, the disadvantages encountered in the manufacture of a "U"-shaped filter, namely pinched shut and flattened shut hollow fibers, and potting difficulties, would desirably be avoided without compromising the size of the filter or the ease of manufacture. Important, too, is the adaptability of a more efficient filter for use in presently existing industrial hardware. It would also be desirable to provide a microfilter where small leaks in the filter membrane can be repaired without discarding the entire filter.

BRIEF SUMMARY OF THE INVENTION

The present invention provides a microfilter having particular utility in the filtration of parenteral solutions during their manufacture, as well as any other desired uses. The filter includes a non-permeable central tube having open ends. Porous, hollow fibers, typically in axial alignment with the central tube, are potted with a sealant to define first and second sealant-impregnated ends. Conventional methods of impregnating the ends of a bundle of hollow fibers may be employed particularly by using hollow fiber dialyzer technology. One method of potting hollow fibers is disclosed in U.S. Pat. No. 4,227,295, *Method of Potting the Ends of a Bundle of Hollow Fibers Positioned in a Casing*, to Bodnar, et al.

It should be understood that the porous, hollow fibers are not restricted to axial alignment with the tube. That is, the fibers are in longitudinal relation with the tube where "longitudinal relation" contemplates, for example, a helical arrangement of fibers, or any other arrangement in which the overall direction of the fibers is longitudinal. Furthermore, the filter of this invention is not restricted to having a non-permeable, central tube. In some filtering situations a permeable tube may be used, and the positioning of the tube is not absolutely restricted to a central location with respect to the general filter geometry.

After potting or sealant-impregnating, the ends are cut so that the hollow fibers and the tube have open flow paths from the first end to the second end. A casing or housing is used to contain the central tube and the hollow fibers, as well as to assist in the potting of the ends. The housing of this invention for dead end filtration is perforated to allow fluid flow into or out of the housing. One end of the filter is covered by a manifold defining a closed chamber thereover which communicates with one end of the central tube and hollow fibers. A manifold which defines a fluid portal covers the other end of the filter, and communicates with the other end of the central tube and hollow fibers. Thus the non-permeable central tube shunts fluid between the fluid portal and the closed chamber. This design is particularly suited for dead-end microfiltration applications.

Another embodiment of this invention contemplates use in cross-flow microfiltration applications. Once again, conventional potting techniques are used to pot the porous, hollow fibers and the central tube within an enclosed, non-perforated housing. The defined first and second potted ends are cut so that the hollow fibers and the tube have open flow paths from the first end to the second end. Inlet and outlet connections, located at opposite ends of the housing, define a closed flow path over the outside of the fibers. One end of the filter is covered by a manifold defining a closed chamber thereover which communicates with one end of the central tube and hollow fibers. A manifold which defines a fluid portal covers the other end of the filter, and communicates with the other end of the central tube and hollow fibers. In this filter embodiment, fluid flows across the hollow fibers from the inlet connection to the outlet connection. Fluid is filtered through the porous, hollow fibers from the exterior to the interior and is collected from the fluid portal end.

Advantages of the present invention over existing microfilters are numerous. By allowing fluid to flow through both ends of the hollow fibers, a 40 to 100 percent increase in performance of the filter can be realized over sealed end filters. Known hollow fiber dialyzer technology can easily be used to manufacture the filters. Filters of the present design can be placed in existing industrial hardware, thereby obviating costly changeover. Repair of a leaky filter can be made simply by identifying the leaky fibers and sealing the ends; thus this filter is repairable.

An alternative embodiment for cross-flow microfiltration applications minimizes the number of external connections for this type filter while maximizing efficiency of the filter.

BRIEF DESCRIPTION OF THE DRAWINGS

For a more complete understanding of this invention, reference should now be had to the embodiments illustrated in greater detail in the accompanying drawings.

In the drawings:

FIG. 1 is a perspective view of the filter of the present invention.

FIG. 2 is a cross-section of the filter taken along line 2—2 of FIG. 1, showing the central tube and manifolds covering the ends.

FIG. 3 is a cross-section of the filter taken along line 3—3 of FIG. 1, showing the arrangement of porous, hollow fibers in the filter.

DESCRIPTION OF THE PREFERRED EMBODIMENTS

Figure 4:
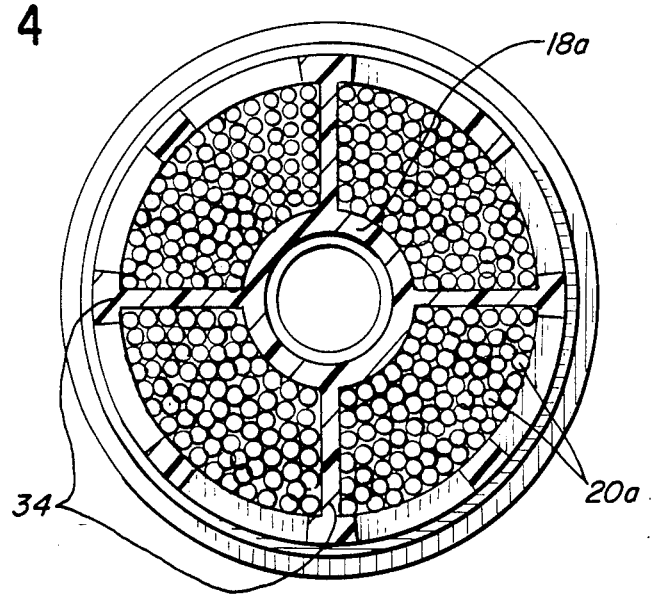
FIG. 4 is a cross-section, similar to FIG. 3, showing another arrangement of porous, hollow fibers in the filter.

The basic configuration of the filter of the present invention is illustrated in the perspective view shown in FIG. 1. Filter 10 is shown with cylindrical housing 12 having perforations 13. The perforations generally can be in any arrangement or of any shape. Lower manifold 14 and upper manifold 16 cover the ends of the filter. Housing 12 may be of generally conventional design, and may be proportioned to fit presently existing filter systems, for upgrading the system performance with little or no "hardware" modification.

The construction of filter 10 of the present invention is better appreciated by viewing the sectional view of FIG. 2. Cylindrical housing 12 is shown enclosing central, non-permeable tube 18 and a plurality of porous, hollow fibers 20. The assembly of porous, hollow fibers 20 and central tube 18 has first sealant-impregnated end 22 and second sealant-impregnated end 24. First end 22 and second end 24 may be potted using conventional potting materials such as polyurethane, and following conventional methods of potting hollow fiber assemblies. After the ends have been potted they are cut to define open flow paths from first end 22 to second end 24.

Lower manifold 14, having fluid portal 26, covers first end 22. Upper manifold 16 covers second end 24 to define closed chamber 28 enclosing second end 24.

The filter of the present invention may be used in either of two manners. In preferred use, filter 10 is placed in a chamber containing the fluid to be filtered. End 30 of lower manifold 14 is generally attached to a fixture which allows fluid passage out of filter 10. Tip 17 is placed in a fixture to generally stabilize filter 10.

Fluid 32 is shown entering perforations 13 of housing 12. Fluid 32 is filtered through the walls of porous, hollow fibers 20 into the bores thereof, and simultaneously flows toward first end 22 and second end 24. Fluid exiting the porous, hollow fibers at second end 24 enters closed chamber 28 for shunting through central tube 18 to lower manifold 14. Filtered fluid exiting from porous, hollow fibers 20 at first end 22 and shunted fluid exiting from central tube 18 flow together out of portal 26 of lower manifold 14 for collection.

Filtration is preferred from outside to inside for a number of reasons. For instance, the outsides of hollow fibers have a larger surface area than the inside, and thus provide a larger membrane surface for filtering, thus increasing filter efficiency. Also, when filtering from outside to inside, hollow fibers will collapse if pressures are too great. Thus, unfiltered fluid will not pass through for collection. However, when filtering is from inside to outside, fibers can burst if pressures are too great, thus contaminating the filtered fluid.

It should also be appreciated that at lower pressures though, fluid can be filtered by passing it through the filter of the present invention in the opposite direction. That is, fluid can pass from inside the fibers to the outside. Fluid enters portal 26 of lower manifold 14. A portion of the fluid is shunted through central tube 18 while the unshunted portion of fluid enters porous, hollow fibers 20 at first end 22. The shunted fluid fills closed chamber 28, from where fluid enters porous, hollow fibers 20 at second end 24. Fluid entering both ends of porous, hollow fibers 20 is filtered through the pores of the hollow fibers and percolates through perforations 13 in housing 12.

It can be appreciated that housing 12 supports, protects and contains the assembly of porous, hollow fibers and the central tube during the potting process and during filtration.

Allowing flow through both ends of the porous, hollow fibers achieves approximately a 40 to 100 percent increase in filtering efficiency over a sealed-end filter irrespective of whether fluid is filtered from outside to inside or from inside to outside.

Figure 5:
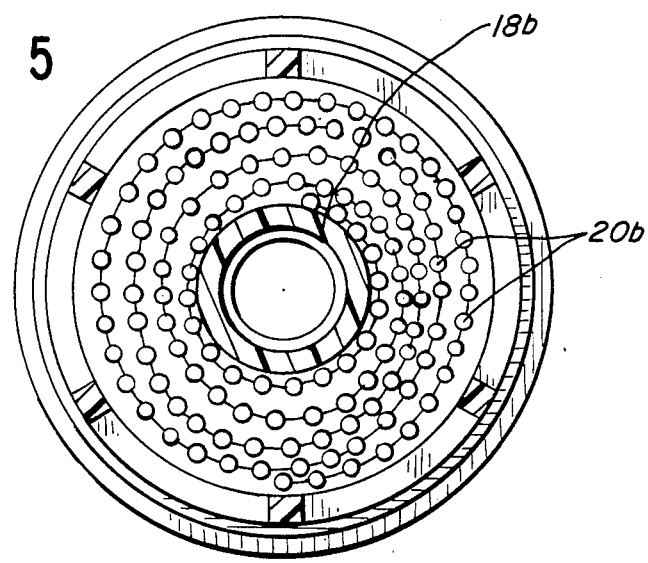
FIG. 5 is a cross section, similar to FIG. 3, showing still another arrangement of porous, hollow fibers in the filter.

FIG. 3 shows the arrangement of porous, hollow fibers 20 surrounding central tube 18. Alternatively, hollow fibers 20a, shown in FIG. 4, are arranged in bundles separated by radial ribs 34. FIG. 5 shows another alternative arrangement of porous, hollow fibers 20b. Porous, hollow fibers 20b are shown contained in a screen matrix or fabric. The screen matrix may then be wound around central tube 18b.

Figure 6:
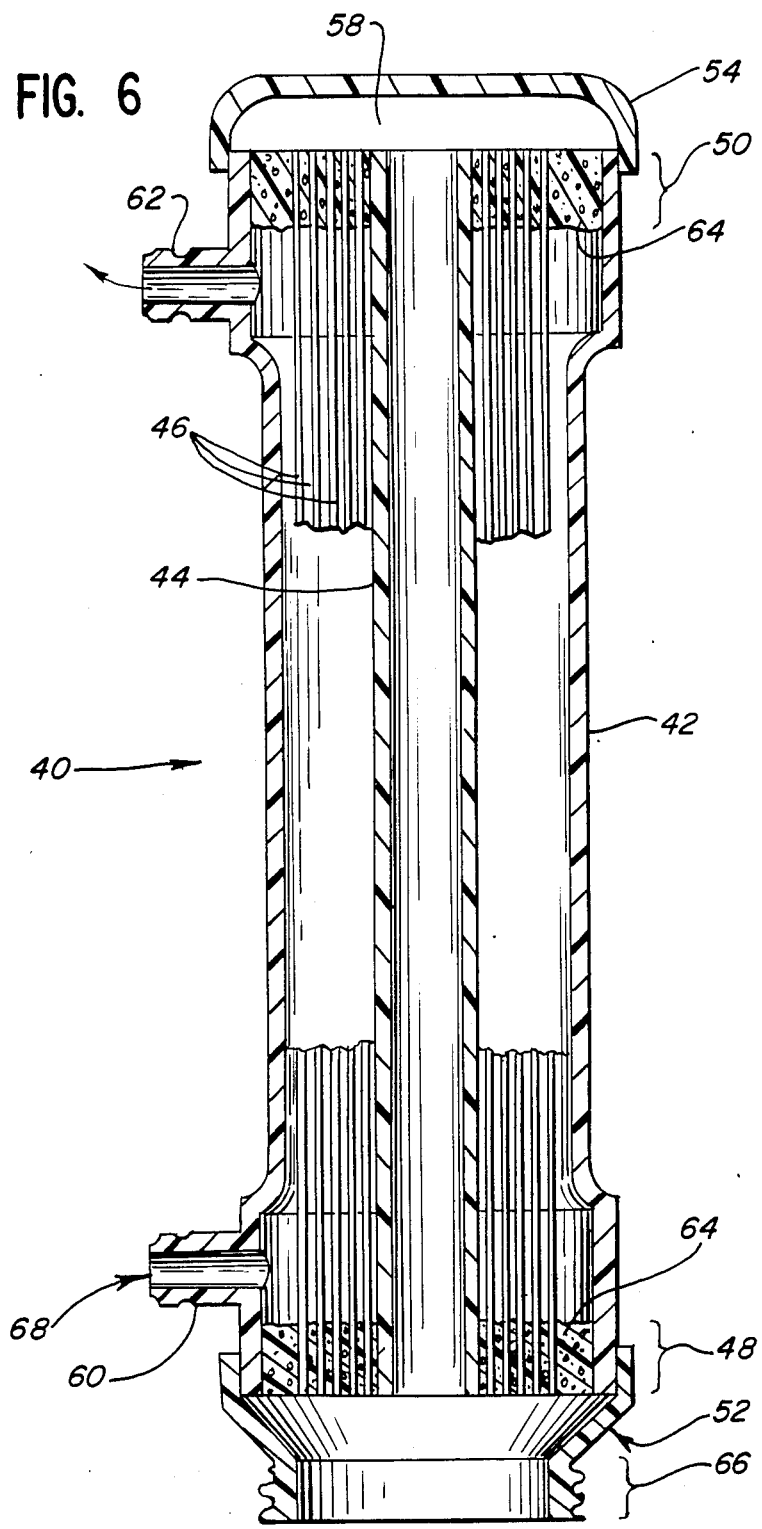
FIG. 6 is a cross-section of the filter of the present invention for use in cross-flow microfiltration applications.

FIG. 6 illustrates the construction of filter 40, another embodiment of the present invention, suitable for cross-flow microfiltration applications. Filter 40 is shown with housing 42. Housing 42 may be of a design generally conventional for tubular housings used for hollow fiber dialyzers. An example of a cylindrical, tubular housing for a hollow fiber dialyzer is disclosed in U.S. Pat. No. 4,227,295, *supra.*

Housing 42 is shown enclosing central, non-permeable tube 44 and a plurality of porous, hollow fibers 46. The assembly of porous, hollow fibers 46 and central tube 44 have first sealant-impregnated end 48 and second sealant-impregnated end 50. First end 48 and second end 50 may be potted using conventional potting materials such as polyurethane, and following conventional methods of potting hollow fiber assemblies. After the ends have been potted they are cut to define open flow paths from first end 48 to second end 50.

Lower manifold 52, having fluid portal 56, covers first end 48. Upper manifold 54 covers second end 50 to define closed chamber 58 enclosing second end 50. Inlet connection 60 and outlet connection 62 are located at the respective ends of filter 40. It should be realized that the location of the inlet and outlet connections on the respective ends of the filter is not restricted to the positions shown in the figure. Inlet connection 60 and outlet connection 62 function to define a cross-flow path for fluid over hollow, porous filters 46.

In preferred use, a feed line is connected to inlet connection 60 and a collection line is connected to outlet connection 62. Fluid flows over the outsides of porous, hollow fibers 46 for filtering to the inside. Sealant 64 functions to separate filtered from unfiltered fluid. End 66 of lower manifold 52 is generally attached to a fixture which allows fluid passage out of filter 40. Fluid 68 is shown entering inlet connection 60 of housing 42. Fluid 68 is filtered through the walls of porous, hollow fibers 46 into the bores thereof, and simultaneously flows toward first end 48 and second end 50. Fluid exiting the porous, hollow fibers at second end 50 enters closed chamber 58 for shunting through central tube 44 to lower manifold 52. Filtered fluid exiting from porous, hollow fibers 46 at first end 48 and shunted fluid exiting from central tube 44 flow together out of portal 56 of lower manifold 52 for collection.

Many benefits are realized by using cross-flow filtration techniques. Cross-flow filtration extends the life of filters because large quantities of particles do not build up on the filter membrane as occurs with dead-end filters. Particles are substantially washed away by the flowing, unfiltered fluid in cross-flow filters. The particles that are deposited on the filter membrane can be washed away by using generally known methods of back flushing cross-flow filters, further extending their useful life. These back flushing methods generally are not adaptable to dead end filters.

Gelatinous solutions can be filtered with crossflow filters. It is difficult, if not impossible, to filter gelatinous solutions with dead-end filters. Indeed, by using the cross-flow filter embodiment of this invention gelatinous solutions can be filtered at relatively high shear velocities and relatively low flow rates. This is possible because the porous, hollow fibers—as compared with a flat membrane—provide more membrane surface area for a given quantity of membrane material.

The arrangement of porous, hollow fibers 46 may generally be the arrangement shown in FIG. 3 with the porous, hollow fibers surrounding the central tube. Alternatively, the hollow fibers may be arranged in bundles separated by radial ribs as shown in FIG. 4, or the porous, hollow fibers may be contained in a screen matrix or fabric which is then wound around the central tube as shown in FIG. 5.

Polypropylene, polyolefins with a high polypropylene content, polyethylene, or nylon are preferred materials for the hollow fiber membranes used in the present invention. It should be understood, however, that many other thermoplastic resins are also suitable materials for hollow fiber, microporous membranes usable in this invention. Porous, hollow fibers 20 or 46 used in this invention may typically have an inside diameter of between 100 and 500 microns. Wall thickness of the fibers will typically range from 50 to 300 microns. The void fraction, that is the ratio of the difference between the density of the membrane material and the density of the membrane to the density of the membrane material represented as a percentage, of the hollow fibers typically ranges from 60 to 75 percent. Average pore size preferably is between 0.1 and 0.5 microns. Good filtration rates have been achieved using polypropylene hollow fibers having inside diameters of 320 microns, wall thickness of 150 microns and void fractions of 65 percent.

Hollow fiber pore sizes for dead end and crossflow microfiltration applications typically are about 0.4 micron for filtration of pharmaceuticals, 0.2 micron for sterilizing of fluids, and from 0.05 to 0.1 micron for filtering washing fluids used in the electronics industry.

The above has been offered for illustrative purposes and is not intended to limit the invention of this application, which is defined in the claims below.

What is claimed is:

1. A fluid filtration method comprising the steps of, conducting a fluid stream within a housing having longitudinally spaced opposite end portions past a microporous hollow fiber membrane arranged longitudinally in the housing and having an axial bore with opposite open ends located adjacent to the opposite end portions of the housing, filtering filtrate from the fluid stream through the portions of the fiber and into the fiber bore, conducting the filtrate within the fiber bore simultaneously through the opposite open ends of the fiber, collecting the filtrate within the housing at one of the opposite open ends of the fiber in a first manifold which closes one of the opposite end portions of the housing and which has no port, while simultaneously collecting the filtrate within the housing at the other opposite end of the fiber in a second manifold which closes the other opposite end portion of the housing and which has an outlet port, transporting the filtrate collected in the first manifold internally through the housing into the second manifold, there combining this filtrate with filtrate collected in the second manifold, and discharging the combined filtrate through the outlet port of the second manifold.

* * * * *